(12) United States Patent
Shao

(10) Patent No.: US 12,483,578 B2
(45) Date of Patent: Nov. 25, 2025

(54) METHODS AND SYSTEMS FOR INDUSTRIAL INTERNET OF THINGS (IIoT) SECURITY MANAGEMENT BASED ON MANAGEMENT CLOUD PLATFORM

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/963,738

(22) Filed: Nov. 28, 2024

(65) Prior Publication Data
US 2025/0097248 A1    Mar. 20, 2025

(30) Foreign Application Priority Data
Oct. 28, 2024    (CN) .......................... 202411505527.X

(51) Int. Cl.
*H04L 9/00*    (2022.01)
*H04L 9/40*    (2022.01)

(52) U.S. Cl.
CPC ...... *H04L 63/1425* (2013.01); *H04L 63/1433* (2013.01); *H04L 63/20* (2013.01)

(58) Field of Classification Search
CPC .. H04L 63/1425; H04L 63/1433; H04L 63/20
(Continued)

(56) References Cited

U.S. PATENT DOCUMENTS

2019/0392141 A1*  12/2019  Bardini ............... G05B 9/02
2020/0348662 A1   11/2020  Cella et al.
(Continued)

FOREIGN PATENT DOCUMENTS

| CN | 108600260 A | 9/2018 |
|----|-------------|--------|
| CN | 109375594 A | 2/2019 |

(Continued)

OTHER PUBLICATIONS

Notification to Grant Patent Right for Invention in Chinese Application No. 202411505527.X mailed on Jan. 3, 2025, 4 pages.
(Continued)

*Primary Examiner* — Christopher J Brown
(74) *Attorney, Agent, or Firm* — PORUS IP LLC

(57) ABSTRACT

Disclosed is a method and system for industrial Internet of Things (IIoT) security management based on a management cloud platform, and a medium. The method is implemented by the management cloud platform of the system, comprising: obtaining a security control region of at least one of production line; determining a security monitoring parameter of the security control region; generating a security monitoring instruction; obtaining security monitoring information collected by a security monitoring device based on the security monitoring parameter; generating a security management parameter of the security control region; in response to receiving confirmation information sent by an IIoT management platform, generating a security management instruction based on the confirmation information; sending the security management instruction to an IIoT perceptual control platform through the IIoT management platform; and obtaining an execution result of the IIoT perceptual control platform based on the security management instruction, and adjusting the security monitoring parameter based on the execution result.

9 Claims, 4 Drawing Sheets

(58) Field of Classification Search
USPC .......................................................... 726/22
See application file for complete search history.

(56) References Cited

U.S. PATENT DOCUMENTS

| | | | |
|---|---|---|---|
| 2021/0232989 A1* | 7/2021 | Rana | .................... G05B 19/418 |
| 2024/0028008 A1 | 1/2024 | Shao et al. | |
| 2024/0411635 A1 | 12/2024 | Shao | |

FOREIGN PATENT DOCUMENTS

| | | |
|---|---|---|
| CN | 108490889 B | 9/2019 |
| CN | 112099400 A | 12/2020 |
| CN | 116839662 A | 10/2023 |
| CN | 118534883 A | 8/2024 |

OTHER PUBLICATIONS

First Office Action in Chinese Application No. 202411505527.X mailed on Dec. 13, 2024, 10 pages.
Beijing Likong Yuantong Technology Co., Ltd., Intelligent distribution operation and maintenance based on Industrial Internet of Things, Automation Panorama, 2023, 11 pages.

* cited by examiner

METHODS AND SYSTEMS FOR INDUSTRIAL INTERNET OF THINGS (IIoT) SECURITY MANAGEMENT BASED ON MANAGEMENT CLOUD PLATFORM

CROSS-REFERENCE TO RELATED APPLICATIONS

This application claims priority to Chinese Application No. 202411505527.X, filed on Oct. 28, 2024, the entire contents of which are incorporated herein by reference.

TECHNICAL FIELD

The present disclosure relates to the field of production safety management, and in particular to a method and a system for industrial Internet of Things (IIoT) security management based on a management cloud platform and a medium.

BACKGROUND

Real-time monitoring and data collection can be performed on devices, personnel, or the like, in factories with the IIoT. However, how to effectively manage personnel performing different production tasks in different time periods, especially when personnel or operation devices not in the current time period still remain in the production region, and how to take early warning measures in time to avoid interference with normal production activities, have become an urgent problem. Moreover, when there are a plurality sets of production lines (or a plurality of processing workshops/factories), the IIoT corresponding to each set of production lines is independent of each other, which is not favorable for effective data utilization.

Therefore, it is desirable to provide a method and a system for IIoT security management based on a management cloud platform to provide more precise control of personnel and devices, etc., so as to ensure safe and efficient operation of factory production. Information communication among IIoTs is realized through the management cloud platform, which provides a reference for information processing and operation of at least one IIoT.

SUMMARY

One or more embodiments of the present disclosure provide a method for industrial Internet of Things (IIoT) security management based on a management cloud platform. The method may comprise: obtaining a security control region of at least one production line through an IIoT management platform corresponding to the at least one production line; determining a security monitoring parameter of the security control region; generating a security monitoring instruction based on the security monitoring parameter and sending the security monitoring instruction to a security monitoring device of an IIoT perceptual control platform through the IIoT management platform; obtaining security monitoring information collected by the security monitoring device based on the security monitoring parameter; generating, based on the security monitoring information, a security management parameter of the security control region, the security management parameter including at least one of a security warning parameter and a production scheduling parameter, and sending the security management parameter to the IIoT management platform; in response to determining that confirmation information sent by the IIoT management platform is received, generating a security management instruction based on the confirmation information; sending the security management instruction to the IIoT perceptual control platform through the IIoT management platform, the IIoT perceptual control platform including a warning platform and an operation platform, the warning platform being configured to control a warning device to issue a security warning signal based on the security warning parameter, and/or the operation platform being configured to update an operation parameter of the at least one production line based on the production scheduling parameter; and obtaining an execution result of the warning platform based on the security management instruction, and adjusting the security monitoring parameter based on the execution result.

One or more embodiments of the present disclosure provide a system for industrial Internet of Things (IIoT) security management based on a management cloud platform. The system may comprise the management cloud platform and at least one subsystem. The at least one subsystem may include a subsystem corresponding to at least one production line. Each of the at least one subsystem may include an IIoT user platform, an IIoT service platform, an IIoT management platform, an IIoT sensor network platform, and an IIoT perceptual control platform. The management cloud platform may be configured to: obtain a security control region of the at least one production line through the IIoT management platform corresponding to the at least one production line; determine a security monitoring parameter of the security control region; generate a security monitoring instruction based on the security monitoring parameter and send the security monitoring instruction to a security monitoring device of the IIoT perceptual control platform through the IIoT management platform; obtain security monitoring information collected by the security monitoring device based on the security monitoring parameter; generate, based on the security monitoring information, a security management parameter of the security control region, the security management parameter including at least one of a security warning parameter and a production scheduling parameter, and send the security management parameter to the IIoT management platform; in response to determining that confirmation information sent by the IIoT management platform is received, generate a security management instruction based on the confirmation information; send the security management instruction to the IIoT perceptual control platform through the IIoT management platform, the IIoT perceptual control platform including a warning platform and an operation platform, the warning platform being configured to control a warning device to issue a security warning signal based on the security warning parameter, and/or the operation platform being configured to update an operation parameter of the at least one production line based on the production scheduling parameter; and obtain an execution result of the warning platform based on the security management instruction, and adjusting the security monitoring parameter based on the execution result.

One or more embodiments of the present disclosure provide a non-transitory computer-readable storage medium storing computer instructions that, when read by a computer, may direct the computer to perform the method described in the above embodiments.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

In order to more clearly illustrate the technical solutions of the embodiments of the present disclosure, the accompanying drawings, which are required to be used in the description of the embodiments, are briefly described below. The accompanying drawings do not represent the entirety of the embodiments.

It should be understood that "system", "device", "unit" and/or "module" as used herein is a method for distinguishing different components, elements, portions, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

When describing the operations performed in the embodiments of the present disclosure in terms of steps, the order of the steps are all interchangeable if not otherwise indicated, the steps may be omitted, and other steps may be included in the process of operation.

Figure 1:
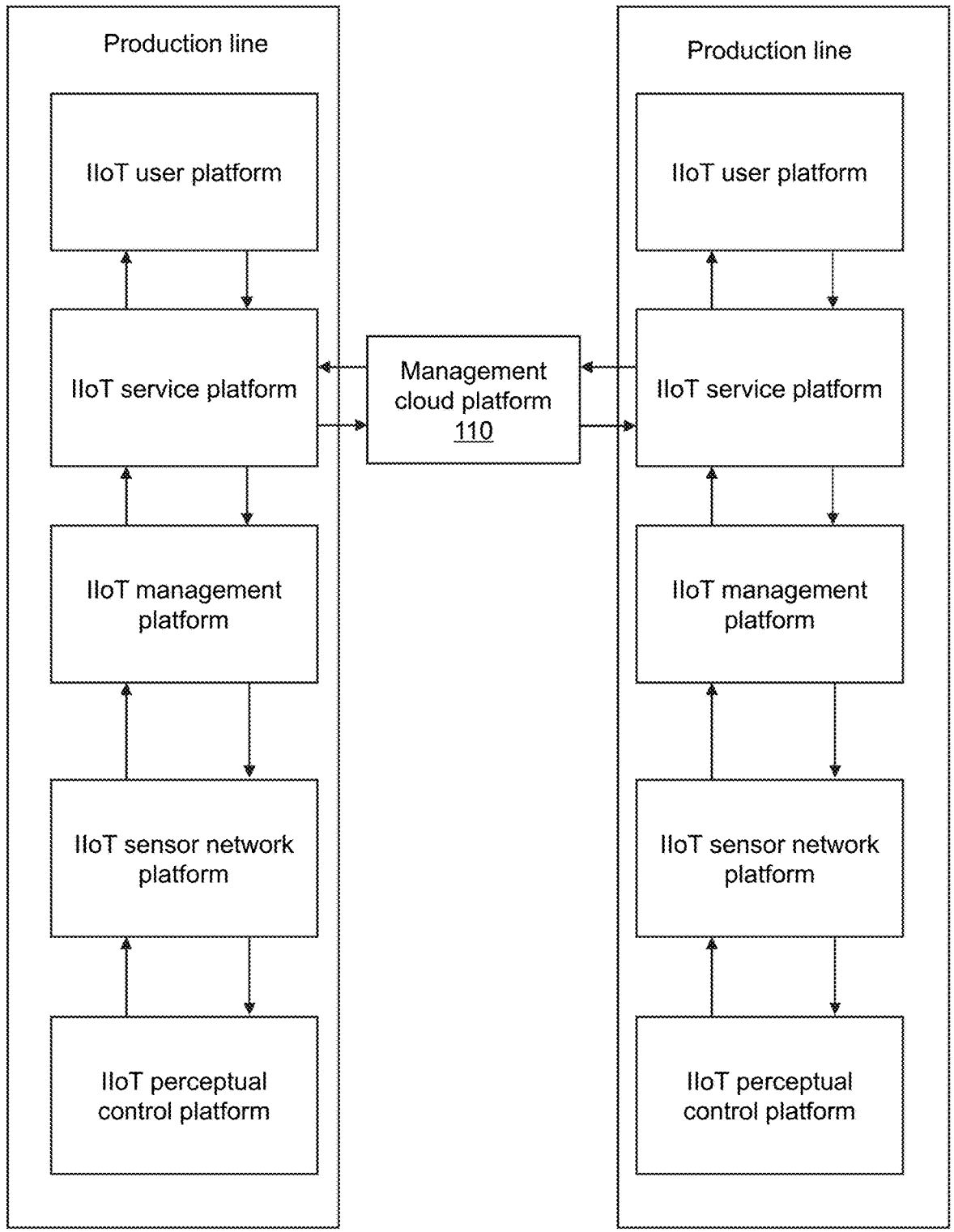
FIG. 1 is a schematic diagram illustrating a platform structure of a system for industrial Internet of Things (IIoT) security management based on a management cloud platform according to some embodiments of the present disclosure.

FIG. 1 is a schematic diagram illustrating a platform structure of a system for industrial Internet of Things (IIoT) security management based on a management cloud platform according to some embodiments of the present disclosure.

As shown in FIG. 1, since a plurality sets of production lines (or a plurality of processing workshops/factories) may be provided during production, the system for IIoT security management based on the management cloud platform (hereinafter referred to as a system 100 for security management) may include a management cloud platform 110 and at least one subsystem. One production line may correspond to one of the at least one subsystem. Each subsystem includes an IIoT user platform, an IIoT service platform, an IIoT management platform, an IIoT sensor network platform, and an IIoT perceptual control platform. The at least one subsystem may be in communication connection with the management cloud platform 110 to realize sharing of information in each of the at least one subsystem through the management cloud platform.

The management cloud platform is a platform for enabling information interaction between the at least one subsystem. In some embodiments, the management cloud platform may be configured as a server in the cloud that may interact with IIoT management platforms in different subsystems. The management cloud platform may further include a storage device in the cloud to save data uploaded by the at least one subsystem.

In some embodiments, the management cloud platform may be configured to obtain a security control region of at least one production line, determine a security monitoring parameter of the security control region, and generate a security monitoring instruction based on the security monitoring parameter. The management platform may be further configured to obtain security monitoring information, and generate, based on the security monitoring information, a security management parameter of the security control region. In response to determining that confirmation information sent by the IIoT management platform is received, the management cloud platform may be further configured to generate, based on the confirmation information, a security management instruction, and obtain an execution result of a warning platform based on the security management instruction, and adjust the security monitoring parameter based on the execution result.

In some embodiments, the management cloud platform may be further configured to obtain production information of the at least one production line and the security control regions for a plurality of time periods; determine, based on an interference frequency, a security control node; and determine, based on the production information, a security control parameter of the at least one production line.

In some embodiments, the management cloud platform may be further configured to determine the security control parameter based on a mapping relationship and the production information; update the mapping relationship based on management perception information; determine the security management parameter based on security risk data; and determine the security risk data through a risk recognition model based on the security monitoring information and the security control parameter.

In some embodiments, the management cloud platform may be further configured to determine controllable data and uncontrollable data based on the security risk data, determine a security warning parameter based on the controllable data, and determine a production scheduling parameter based on the uncontrollable data and the production information.

The IIoT user platform is a platform for interacting with a user. In some embodiments, the IIoT user platform may be configured as a terminal device and/or a terminal interface. The terminal device may include a mobile device or a tablet computer, etc. The terminal interface may include a terminal device interface, a web page, etc.

The IIoT service platform is a platform that provides information and services to the user. In some embodiments, the IIoT service platform may be configured on a local server. The IIoT service platform may interact with the IIoT user platform and the IIoT management platform.

The IIoT management platform is a platform that manages information and/or data related to the at least one subsystem. In some embodiments, the IIoT management platform may include a processor, a storage device, etc. The storage device may be configured to store a plurality of databases. A database is a database management system that supports high concurrent access. Processors may include a central processing unit (CPU), an application specific integrated circuit (ASIC), an application specific instruction processor (ASIP), a graphics processing unit (GPU), or the like, or any combination thereof.

The IIoT sensor network platform is a platform for integrated management of sensor information. In some embodiments, the IIoT sensor network platform may be configured as a communication network or a gateway and a network interface, etc. The IIoT sensor network platform may interact with the IIoT management platform and the IIoT perceptual control platform.

The IIoT perceptual control platform is a functional platform for perceptual information generation and control information execution. In some embodiments, the IIoT perceptual control platform may include an operation device and a security monitoring device.

The operation device is a device used in the production of a product, such as a storage device, a transportation device, a processing device, etc.

The security monitoring device is a device that monitors a production line. In some embodiments, the security monitoring device may include a high-definition camera with a recognition function, an inductive recognition device, or the like. In some embodiments, the security monitoring device may be in communication connection with the management cloud platform.

The high-definition camera may be configured to recognize an operator in the security control region and a model number and/or code of the operation device. The model number and/or code of the operation device may reflect a type of the operation device. The type of the operation device may include an automated robot or a material conveying device, etc.

The inductive recognition device may be configured to recognize a person or an operation device that enters the security control region. In some embodiments, the inductive recognition device may include an access control device, etc. In response to determining that a person or a device swipes a card through the access control device to enter the security control region, the IIoT perceptual control platform may recognize the person or the operation device entering the security control region through a card swipe record.

Figure 2:
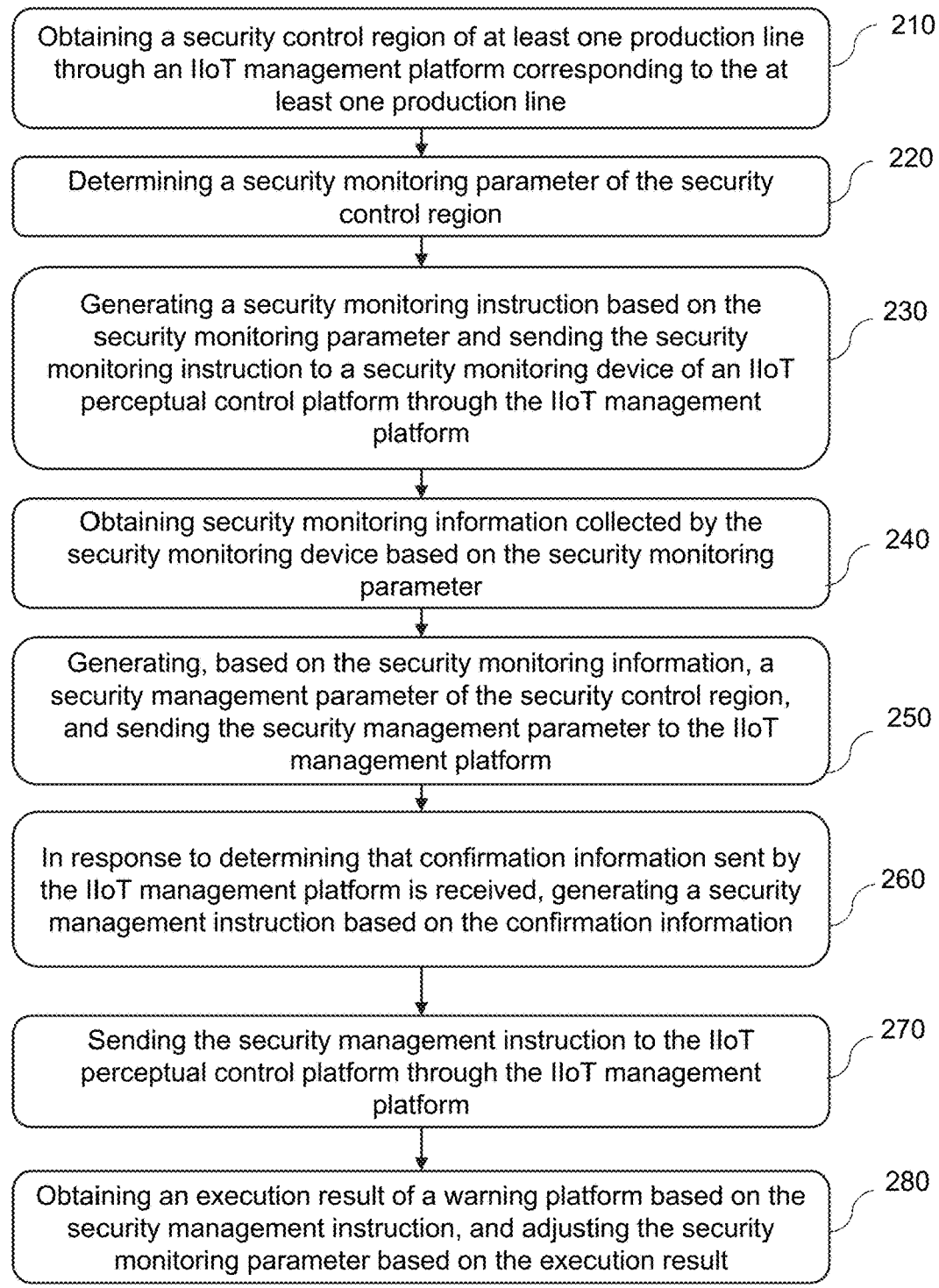
FIG. 2 is a flowchart illustrating an exemplary method for industrial Internet of Things (IIoT) security management based on a management cloud platform according to some embodiments of the present disclosure.
Figure 3:
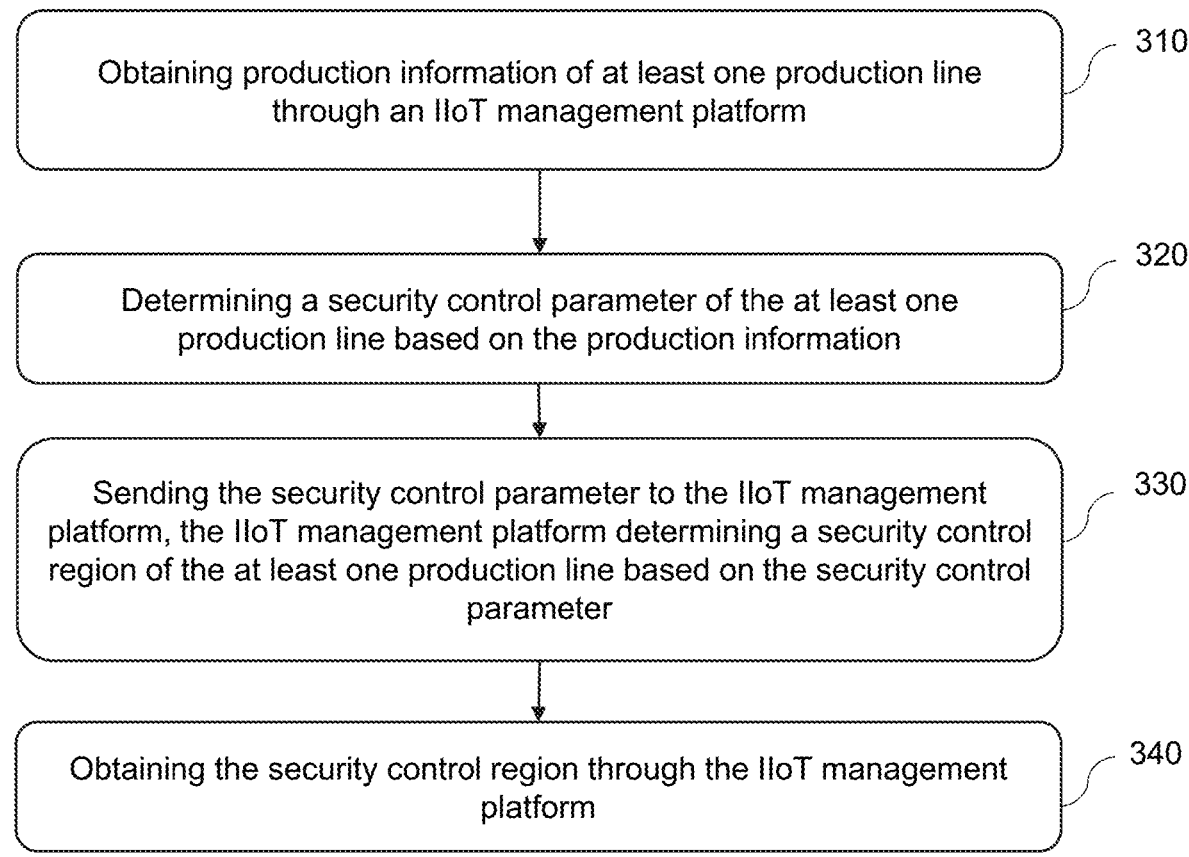
FIG. 3 is a flowchart illustrating an exemplary process of obtaining a security control region according to some embodiments of the present disclosure.
Figure 4:
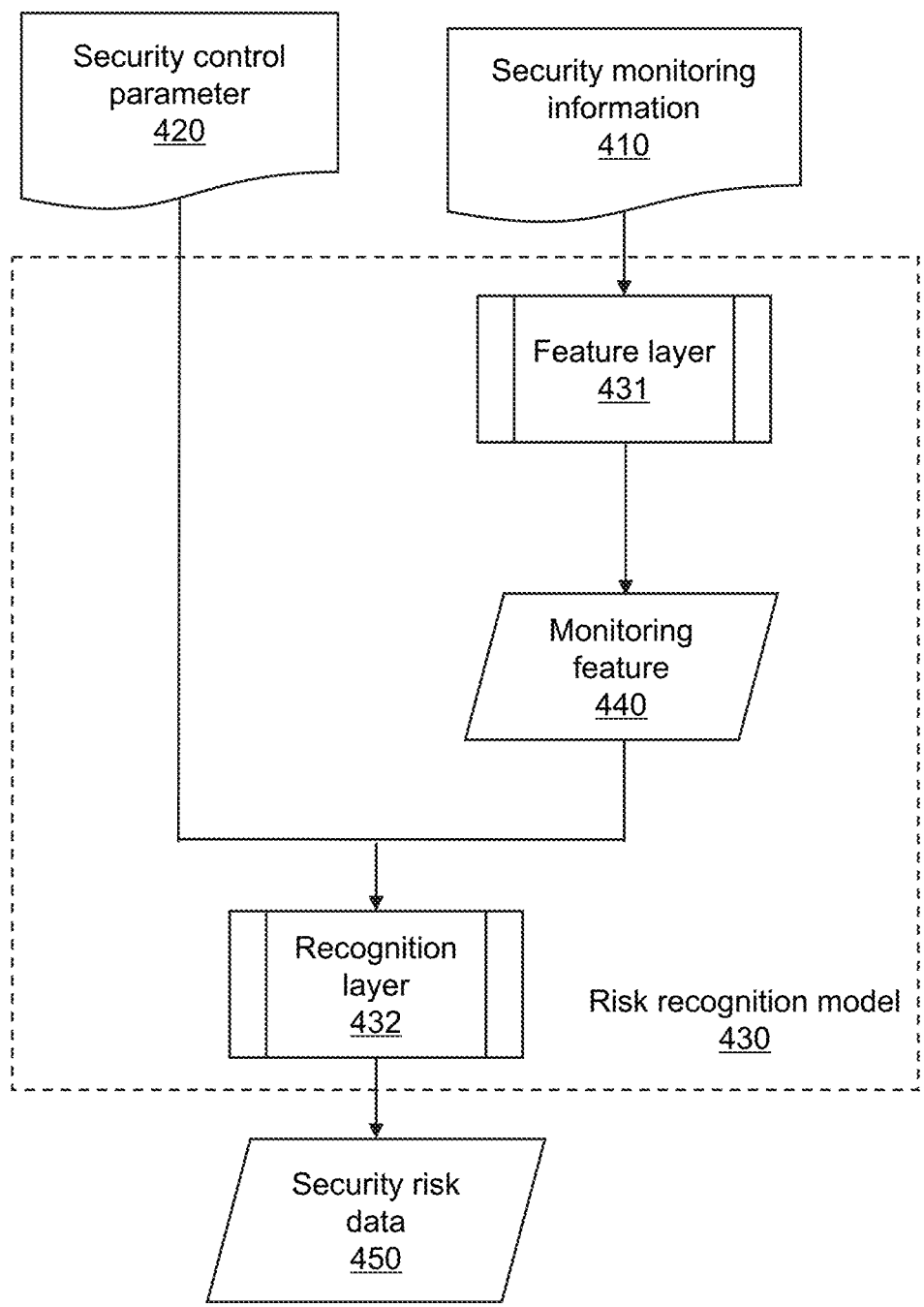
FIG. 4 is a schematic structural diagram illustrating an exemplary risk recognition model according to some embodiments of the present disclosure.

More descriptions may be found in the related descriptions of FIGS. 2-4.

In some embodiments of the present disclosure, a closed loop of information operation may be formed between the functional platforms for coordinated and regular operation based on the system 100 for security management, so as to realize the intellectualization of IIoT security management.

FIG. 2 is a flowchart illustrating an exemplary method for IIoT security management based on a management cloud platform according to some embodiments of the present disclosure. In some embodiments, a process 200 may be performed by a management cloud platform of the system for IIoT security management based on the management cloud platform. As shown in FIG. 2, the process 200 may include the following operations.

In some embodiments, the management cloud platform may obtain, through an IIoT management platform corresponding to at least one production line, a security control region of the at least one production line; determine a security monitoring parameter of the security control region; and generate, based on the security monitoring parameter, a security monitoring instruction. The management cloud platform may obtain security monitoring information collected by a security monitoring device based on the security monitoring parameter; generate, based on the security monitoring information, a security management parameter of the security control region; and in response to determining that confirmation information sent by the IIoT management platform is received, generate a security management instruction based on the confirmation information, and obtain an execution result of a warning platform based on the security management instruction, and adjust the security monitoring parameter based on the execution result.

More descriptions regarding the system for IIoT security management based on the management cloud platform may be found in the related descriptions of FIG. 1.

In 210, obtaining a security control region of at least one of production line through an IIoT management platform corresponding to the at least one of production line.

The security control region is a region of the production line that needs to be controlled or monitored, such as a region of the production line where workstations for each process are located or a region that an operation device needs to pass.

In some embodiments, the management cloud platform may obtain the security control region in various ways. For example, a user may input the security control region through an IIoT user platform, the IIoT user platform may send the security control region to the IIoT management platform through an IIoT service platform, and the management cloud platform may obtain the security control region through the IIoT management platform. In some embodiments, the user may designate a workstation where a security incident often occurs or a region where the operation device needs to pass as the security control region based on historical experience. The security incident may include at least one of a device failure or an operational violation, or the like.

In some embodiments, the management cloud platform may obtain production information of the at least one production line and the security control region for a plurality of time periods through the IIoT management platform. The security control region for the plurality of time periods may be determined through the IIoT management platform corresponding to the at least one production line. The IIoT management platform may determine a security control node based on the production information, and determines the security control region for the plurality of time periods based on the security control node.

The production information is information related to production of the production line. In some embodiments, the production information may include a type of a processed product, a production quantity, a processing procedure, a processing workstation, a model number of the operation device, a production period of each procedure, an operation track of an operator, an operation flow, etc. The operation flow may include a sequence of the processing procedure, a processing parameter, a flow path of a material used, etc.

In some embodiments, the management cloud platform may obtain the production information through the IIoT management platform, and the IIoT management platform may obtain the production information through the IIoT user platform. The user may preset the production information through the IIoT user platform.

The security control node is a node of the production line that needs to be avoided. In some embodiments, the security control node may include at least one of the processing workstation, the operator, the operation device, etc.

In some embodiments, the IIoT management platform may determine the security control node based on the production information in various ways. For example, the IIoT management platform may query, based on the processing workstation, the operator, and the model number of the operation device in the production information, a historical record of security incidents in a historical security database, and designate the processing workstation, the operator, and the operation device having the security incident in the historical record as the security control node. The historical security database may include historical records of a plurality of security incidents. The historical security database may be available from a prestored storage device.

In some embodiments, the production information may include device operation information. The management cloud platform may determine, based on the device operation information, an interference frequency of the operation device; and determine, based on the interference frequency, the security control node. The security control node may include only the operation device.

The following content is described by taking a production line as a current production line for an example.

The device operation information is information related to the operation device. In some embodiments, the device operation information may include the model number, a function, an activity path, or the like, of the operation device. The activity path is a path through which the operation device performs operation.

In some embodiments, the management cloud platform may obtain the device operation information through the IIoT management platform, and the IIoT management platform may obtain the device operation information through the IIoT user platform. The user may preset the device operation information through the IIoT user platform.

The interference frequency is used to characterize the frequency of interference to the operation device. In some embodiments, the interference frequency may be expressed by a numerical value, etc. The larger the numerical value, the higher the interference frequency.

In some embodiments, the management cloud platform may construct a device operation vector based on the device operation information, match a historical device operation vector that satisfies a preset matching condition in a vector database, count management perception information corresponding to the historical device operation vector, and determine the interference frequency based on the management perception information. The device operation vector is a feature vector constructed based on the device operation information. The preset matching condition may include that a vector similarity is maximum. The vector similarity may be negatively correlated with a vector distance. The vector distance may include a Euclidean distance, etc.

The management perception information is information collected when the operation device is interfered with. In some embodiments, the management perception information may include the operation device and the operator that cause the interference to the operation device when the operation device being interfered with sends out an alarm. More descriptions regarding obtaining the management perception information may be found in FIG. 3 and related descriptions thereof.

In some embodiments, the management cloud platform may determine the interference frequency based on the management perception information corresponding to the historical device operation vector. For example, the more the management perception information corresponding to the historical device operation vector, the more the operation device and the operator causing the interference in the management perception information, and the higher the interference frequency.

In some embodiments, the management cloud platform may construct the historical device operation vector based on historical device operation information in historical data, and take the management perception information of the operation device corresponding to the historical device operation vector in a production task and the historical device operation vector as a piece of data to be stored in the vector database. The historical device operation vector is a feature vector constructed based on the historical device operation information.

In some embodiments, the management cloud platform may determine the security control node based on the interference frequency. For example, the management cloud platform may determine an operation device of which the interference frequency is greater than a frequency threshold as the security control node. The frequency threshold may be preset based on historical experience.

In some embodiments, the frequency threshold may be negatively correlated with a count of overlapping production lines. The overlapping production lines are other production lines of which production time periods are the same as or partially overlap with those of the current production line. The IIoT management platform may obtain the production time periods of other production lines through the management cloud platform and determine other production lines of which the production time periods are the same or partially overlap with those of the current production line as the overlapping production lines.

The remaining production lines may be determined as the security control nodes in a similar way described above.

In some embodiments of the present disclosure, the operation device is prone to interference during operation due to the weak ability of active avoidance, the operation device that needs to be categorized as the security control node is determined based on the interference frequency, such that further control of the operation device can be improved, thereby improving productivity and reducing the security risks and maintenance costs of the operation device.

In some embodiments, the IIoT management platform may determine the security control region for the plurality of time periods based on the security control node. In some embodiments, the plurality of time periods may include a plurality of associated time periods corresponding to the security control node. The security control region may include an associated region.

The associated time periods are time periods that are related to the security control node, such as a production time period of the processing workstation, an operation time period of the operator, a running time period of the operation device, etc.

In some embodiments, the IIoT management platform may determine the associated time periods based on the production information. For example, the IIoT management platform may directly use a production time period of each procedure as the production time period of the processing workstation and the operation time period of the operator. As another example, the IIoT management platform may determine the running time period of the operation device based on an operation pace of the operation device and the production time period of each procedure.

The operation pace is data related to operation time of the operation device during a production process. In some embodiments, the operation pace may include an operation frequency, an operation duration, or the like, of the operation device. The IIoT management platform may take a time period corresponding to the operation duration in the production time period of each procedure as the running time period of the operation device. The operation pace may be determined based on a historical operation process of the operation device in the historical data.

The associated region is a region associated with the security control node. In some embodiments, the IIoT management platform may query, based on the historical data, historical production information in the historical data that is the same as the current production information, and take a historical activity region of a historical security control node corresponding to the historical production information as the associated region of a current security control node. The activity region is a region in which the operator or the operation device performs operation.

For each security control node, the management cloud platform may use the associated region as the security control region corresponding to the associated time period.

In some embodiments, the IIoT management platform may send the security control region for the plurality of time periods to the management cloud platform.

In some embodiments of the present disclosure, determining the security control region based on the security control node can realize automatic determination of the security control region, such that the flexibility and accuracy of determining the security control region can be improved, thereby realizing more accurate supervision of the security control region.

In 220, determining a security monitoring parameter of the security control region.

The security monitoring parameter is a parameter related to monitoring of the security control region. In some embodiments, the security monitoring parameter may include a monitoring time period, a monitoring frequency, etc.

The monitoring time period is a time interval during which the security control region is monitored.

In some embodiments, the management cloud platform may determine the production time period of each procedure and the running time period of the operation device as the monitoring time period. The monitoring time period may further include a preset time period before the production line begins operation. The preset time period may be preset based on historical experience. More descriptions regarding the production time period of each procedure and the running time period of the operation device may be found in the operation 210 and related descriptions thereof.

The monitoring frequency is a frequency at which the security control region is monitored.

In some embodiments, the management cloud platform may obtain a frequency of alarms issued by a plurality of operation devices in the security control region based on historical management perception information in the historical data, and determine the monitoring frequency based on the frequency. For example, the higher the frequency, the greater the monitoring frequency.

More instructions regarding the management perception information may be found in operation 320 in FIG. 3 and related descriptions thereof.

In 230, generating a security monitoring instruction based on the security monitoring parameter and sending the security monitoring instruction to a security monitoring device of an IIoT perceptual control platform through the IIoT management platform.

The security monitoring instruction is a control instruction used to control the security monitoring device.

In some embodiments, the management cloud platform may generate the security monitoring instruction based on the security monitoring parameters of different security control regions, and send the security monitoring instruction to the security monitoring device corresponding to the security control region in the IIoT perceptual control platform through the IIoT sensor network platform by the IIoT management platform.

More descriptions regarding the security monitoring device may be found in FIG. 1 and related descriptions thereof.

In 240, obtaining security monitoring information collected by the security monitoring device based on the security monitoring parameter.

The security monitoring information refers to related data obtained by the security monitoring device. In some embodiments, the security monitoring information may include a plurality of monitoring subjects and a stay duration and a movement track of each of the plurality of monitoring subjects in the security control region, etc. The plurality of monitoring subjects may include at least one of the operator or the operation device, etc., present in the security control region.

In some embodiments, the security monitoring device may collect the security monitoring information based on the security monitoring parameter and upload the security monitoring information to the IIoT perceptual control platform. The IIoT perceptual control platform may upload the security monitoring information to the management cloud platform through the IIoT sensor network platform and the IIoT management platform.

In 250, generating, based on the security monitoring information, a security management parameter of the security control region, and sending the security management parameter to the IIoT management platform.

The security management parameter refers to data related to management of the security control region.

In some embodiments, the security management parameter may include a security warning parameter and/or a production scheduling parameter.

The security warning parameter is a parameter for warning the operator or the operation device on the production line. In some embodiments, the security warning parameter may include a warning subject and a warning level.

The warning subject may include unrelated personnel and an unrelated device. The unrelated personnel and the unrelated device are those that are not related to the operation content of the current security control region. In some embodiments, the management cloud platform may determine, based on the production information, an operator and an operation device that are not included in the production information as the unrelated personnel and the unrelated device.

The warning level is data related to an alert level of warning. The warning level may be expressed by a rank, etc. The higher the rank, the higher the warning level.

In some embodiments, the management cloud platform may determine the security warning parameter based on the security monitoring information in various ways. For example, in response to determining that the stay duration of the unrelated personnel and/or the unrelated device in the security control region exceeds a stay duration threshold, the management cloud platform may determine the unrelated personnel and/or the unrelated device as the warning subject and determine the warning level based on the stay duration. The more the stay duration exceeds the stay duration threshold, the higher the warning level corresponding to the warning subject.

The production scheduling parameter is a parameter for scheduling production operations for a plurality of production lines. In some embodiments, the production scheduling parameter may include adjusting a production time period of the production line and/or a running time period of the operation device, etc.

In some embodiments, the management cloud platform may determine the production scheduling parameter based on the security monitoring information in various ways. For example, if the operation device of the current production line is subject to multiple warnings and the movement track is in a security control region of another production line, the management cloud platform may adjust the production time periods of the current production line and the remaining production lines and/or adjust the running time period of the operation device to realize off-peak operation, and use an adjustment result as the production scheduling parameter.

For example, the management cloud platform may determine, based on the production information of different production lines, a production line of which an activity region does not include the security control region as a target production line, switch a production time period of the target production line with the production time period of the current production line, synchronously adjust running time periods of the operation device of the two production lines of which the production time periods are switched, and determine adjusted production time periods and adjusted running time periods as the production scheduling parameter. More descriptions regarding the activity region may be found in the operation 210 and related descriptions thereof.

In some embodiments, the management cloud platform may determine security risk data of the at least one production line based on the security monitoring information; and determine the security management parameter based on the security risk data.

The security risk data is data related to a possible security incident. In some embodiments, the security risk data may include a target monitoring subject and an incident level of the target monitoring subject. The target monitoring subject refers to an operator and an operation device that may cause the security incident. The incident level of the target monitoring subject refers to an incident level of the security incident that may be caused by the target monitoring subject.

In some embodiments, the management cloud platform may determine the security risk data in various ways based on the security monitoring information. For example, the management cloud platform may determine the security risk data based on the following operations.

S11, a historical monitoring database may be obtained by a storage device. The historical monitoring database may include, in the historical data, a triggering subject of each historical security incident, a historical monitoring vector constructed from historical security monitoring information corresponding to the triggering subject, and an incident level of the historical security incident. The triggering subject may include a person or device that triggers the security incident. The historical monitoring vector refers to a feature vector constructed based on the historical security monitoring information.

The incident level is used to characterize the severity of the security incident. In some embodiments, the incident level may be preset by the technician based on, for example, the damage caused by the security incident. The greater the damage, the higher the incident level.

S12, the management cloud platform may determine the security monitoring information corresponding to each monitoring subject by screening the security monitoring information based on the monitoring subject, and determine a monitoring subject corresponding to the unrelated personnel and/or the unrelated device as the target monitoring subject.

S13, the management cloud platform may construct a monitoring information vector based on the security monitoring information of the target monitoring subject, retrieve a historical monitoring vector in the historical monitoring database that satisfies a similarity condition, determine a historical incident level corresponding to the historical monitoring vector as the incident level of the target monitoring subject, and determine the target monitoring subject and the incident level corresponding to the target monitoring subject as the security risk data. The similarity condition may include that a vector similarity a greater than a similarity threshold. The similarity threshold may be preset based on historical experience.

In some embodiments, the management cloud platform may determine the security risk data through a risk recognition model. More descriptions may be found in FIG. 4 and related descriptions thereof.

In some embodiments, the management cloud platform may determine the security management parameter based on the security risk data in various ways. For example, the management cloud platform may screen a target monitoring subject requiring security warning and/or production scheduling based on the incident level of the target monitoring subject in the security risk data.

In some embodiments, the management cloud platform may determine a security control level of the security control region through a correspondence between the incident level and the security control level based on the incident level. When the security control level is greater than a preset level threshold, the management cloud platform may determine that the target monitoring subject requires production scheduling. When the security control level is not greater than the preset level threshold, the management cloud platform may determine that the target monitoring subject requires security warning.

More descriptions regarding determining the security control level and the preset level threshold may be found in the related descriptions of FIG. 3.

For the target monitoring subject that requires production scheduling, the management cloud platform may determine the production scheduling parameter of the target monitoring subject by the process of determining the production scheduling parameter described above based on the production information related to the target monitoring subject.

For the target monitoring subject that requires security warning, the management cloud platform may determine the security warning parameter based on the incident level of the target monitoring subject in the security risk data. For example, the higher the incident level, the higher the warning level in the security warning parameter.

In some embodiments, the management cloud platform may determine controllable data and uncontrollable data based on the security risk data, determine the security warning parameter based on the controllable data, and determine the production scheduling parameter based on the uncontrollable data and the production information.

The controllable data is the security risk data that can be controlled. In some embodiments, the controllable data may include security risk data corresponding to a subject that can be removed. The subject that can be removed may include an operator unrelated to the production line, a non-operating operation device, etc.

The uncontrollable data is the security risk data that cannot be controlled. In some embodiments, the uncontrollable data includes security risk data corresponding to a subject that cannot be removed. The subject that cannot be removed may include an operator and an operation device that need to pass through the security control region due to a production task of another production line.

In some embodiments, the management cloud platform may determine the controllable data and the uncontrollable data based on the security risk data. For example, the management cloud platform may count, based on the production information, paths that must be traveled by the target monitoring subject in the security risk data, calculate a coincide degree between the paths that must be traveled and the movement track corresponding to the target monitoring subject in the security monitoring data, and classify the security risk data of the target monitoring subject as first data or second data based on the coincide degree. The paths that must be traveled may include an operation track of the operator and/or an activity path of the operation device.

In some embodiments, the management cloud platform may calculate a percentage of a portion of the paths that must be traveled that coincides with the movement track to the movement track, and determine the obtained percentage as the coincide degree between the paths that must be traveled and the movement track corresponding to the target monitoring subject in the security monitoring data.

In some embodiments, in response to determining that the coincide degree of target monitoring subject is greater than a coincide degree threshold, the management cloud platform may classify the security risk data corresponding to the target monitoring subject as the uncontrollable data. In response to determining that the coincide degree of target monitoring subject is not greater than the coincide degree threshold, the management cloud platform may classify the security risk data corresponding to the target monitoring subject as the controllable data. The coincide degree threshold may be preset based on historical experience.

For the uncontrollable data, the management cloud platform may determine, based on the production information related to the target monitoring subject, the production scheduling parameter of the target monitoring subject included in the uncontrollable data by the process of determining the production scheduling parameter described above.

For the controllable data, the management cloud platform may determine, based on the stay duration of the target monitoring subject, the security warning parameter of the target monitoring subject included in the controllable data by the process of determining the security warning parameter described above.

In some embodiments of the present disclosure, the security risk data is classified as the controllable data and the uncontrollable data based on the coincide degree, so as to further distinguish the security risk data, thereby further improving the accuracy of determining the security management parameter.

In some embodiments of the present disclosure, by determining the security risk data, the management cloud platform can determine the possible security incident, and further determine the security management parameter capable of effectively ensuring the production security based on the possible security incident.

In some embodiments, the management cloud platform may send the security management parameter to the IIoT management platform.

In 260, in response to determining that confirmation information sent by the IIoT management platform is received, generating a security management instruction based on the confirmation information.

The confirmation information is information that expresses confirmation of the security management parameter. The confirmation information may include a confirmation instruction and the security management parameter. The confirmation instruction may be expressed by a numerical value, or the like, such as 1 for confirmation and 0 for rejection.

In some embodiments, the IIoT management platform may send the received security management parameter to the IIoT user platform, and a manager of the IIoT user platform may determine whether the security management parameter is appropriate and generate the confirmation information, and send the confirmation information to the IIoT management platform. The IIoT management platform may send the confirmation information to the management cloud platform.

In some embodiments, the management cloud platform may generate the security management instruction based on the confirmation information.

The security management instruction is an instruction that is used to control the IIoT perceptual control platform to implement the security management parameter.

In 270, sending the security management instruction to the IIoT perceptual control platform through the IIoT management platform.

In some embodiments, the IIoT perceptual control platform may include a warning platform and an operation platform. The warning platform may control a warning device to issue a security warning signal based on the security warning parameter in the security management parameter. The operation platform may update an operation parameter of the at least one production line based on the production scheduling parameter in the security management parameter.

The warning platform is a platform that controls the warning device. For example, the warning platform may control the warning device to issue the security warning signal based on the security warning parameter.

The warning device is a device that sends the security warning signal. The warning device may include at least one of an audio/video device, a user device, and a warning accessory of the operation device which are arranged on the production line. The user device may include a smartphone or a tablet computer, etc. The warning accessory may include a control chip configured on the operation device for receiving the security warning signal, etc.

In some embodiments, the warning platform may issue the security warning signal to the operator in the security control region through the audio/video device and/or the user device, and issue the security warning signal to the operation device through the warning accessory of the operation device.

In some embodiments, one security control region may correspond to a plurality of warning devices. The warning platform may control the plurality of warning devices to issue the security warning signal to the operator or the operation device in the security control region.

In some embodiments, the security warning signal may include at least one of an acoustic signal or an optical signal, etc.

The warning level in the security warning parameter may be represented by sound loudness, light brightness, or the like, emitted by the warning device.

The operation platform is a platform that updates the operation parameter of the production line. For example, the operation platform may update the operation parameter of the at least one production line based on the production scheduling parameter. The operation parameter may include the operation time period of the production line and/or the running time period of the operation device. Updating the operation parameter may include adjusting or increasing/decreasing the operation time period and/or the running time period, etc.

In 280, obtaining an execution result of a warning platform based on the security management instruction, and adjusting the security monitoring parameter based on the execution result.

The execution result is a result of the execution of the security management instruction by the warning platform. The execution result may include the unrelated personnel and/or the unrelated device leaving or not leaving the security control region for the time being.

In some embodiments, the management cloud platform may adjust the security monitoring parameter if the unrelated personnel and/or the unrelated device does not leave the security control region for the time being. Adjusting the security monitoring parameter may include increasing the monitoring frequency in the security monitoring parameter, etc.

In some embodiments, the management cloud platform may determine an adjustment amount based on the warning level of the security warning parameter (e.g., the higher the warning level, the larger the adjustment amount), and increase the monitoring frequency based on the adjustment amount. The adjustment amount is an adjustment magnitude of the monitoring frequency.

In some embodiments, the management cloud platform may classify a plurality of adjustment levels based on a frequency range between a default monitoring frequency and a maximum monitoring frequency. Each of the plurality of adjustment levels may correspond to one warning level. The management cloud platform may select a corresponding adjustment level based on the warning level, determine an intermediate value of a frequency range corresponding to the selected adjustment level, and take a difference between the intermediate value and the current monitoring frequency as the adjustment amount. The default monitoring frequency is a monitoring frequency used in daily production. The default monitoring frequency may be preset by the technician based on historical experience. The maximum monitoring frequency is the highest monitoring frequency that the security monitoring device can achieve. The maximum monitoring frequency may be determined by factory parameters of the security monitoring device.

In some embodiments of the present disclosure, the management cloud platform is capable of realizing information communication among various IIoTs, automatically determining the security monitoring parameter of the security control region, and determining whether to issue the security warning signal and/or update the operation parameter based on the obtained information, thereby reducing the possibility of security incidents, improving the production safety, and ensuring synergistic operation among a plurality of production lines.

It should be noted that the foregoing description of the process 200 is intended to be exemplary and illustrative only and does not limit the scope of application of the present disclosure. For a person skilled in the art, various corrections and changes can be made to the process 200 under the guidance of the present disclosure. However, these corrections and changes remain within the scope of the present disclosure.

FIG. 3 is a flowchart illustrating an exemplary process of obtaining a security control region according to some embodiments of the present disclosure. In some embodiments, a process 300 may be performed by a management cloud platform of an IIoT security management system based on the management cloud platform. As shown in FIG. 3, the process 300 may include the following operations.

In some embodiments, the management cloud platform may obtain production information of at least one production line through an IIoT management platform; determine, based on the production information, a security control parameter of the at least one production line; send the security control parameter to the IIoT management platform, the IIoT management platform determining a security control region of the at least one production line based on the security control parameter; and obtain the security control region through the IIoT management platform.

In 310, obtaining production information of at least one production line through an IIoT management platform.

More descriptions may be found in the related descriptions of FIG. 2.

In 320, determining a security control parameter of the at least one production line based on the production information.

The security control parameter is data related to control of the production line. In some embodiments, the security control parameter may include each processing procedure on the production line, a security control level and a key control subject corresponding to the processing procedure, or the like.

The security control level is used to characterize the extent to which the processing procedure requires control.

The key control subject may include an operator and/or an operation device, etc.

In some embodiments, the management cloud platform may determine the security control parameter based on the production information in various ways.

For example, the management cloud platform may determine the security control parameter based on the following operations.

S21, a processing feature of each processing procedure on the production line may be determined based on the production information.

The processing feature is a feature related to a processing process of the processing procedure. In some embodiments, the processing feature may include a type of a processing product, the operation device, and a transfer situation (e.g., a pre-processing procedure and a post-processing procedure of the material and the workpiece, etc.) of a material and a workpiece.

In some embodiments, the management cloud platform may extract the processing feature from the production information through a feature processing method, such as principal component analysis.

S22, a control parameter database may be constructed based on historical security incident data of a plurality of production lines.

The historical security incident data is historical data related to historical security incidents. In some embodiments, the historical security incident data may include an incident level of a historical security incident that occurred, a historical processing feature of a processing procedure corresponding to the historical security incident, and incident information. The processing procedure corresponding to the historical security incident is a processing procedure in which the historical security incident occurred. More descriptions regarding the incident level may be found in FIG. 2 and related descriptions thereof.

The incident information is information related to the security incident. In some embodiments, the incident information includes an operator or an operation device that causes the incident, a location of occurrence, time of occurrence, and an operation being performed by the operator or the operation device at the time of the occurrence.

The control parameter database may include a plurality of historical processing features and a reference control level and a reference control subject corresponding to each of the plurality of historical processing features.

In some embodiments, the management cloud platform may select, based on the historical security incident data, the historical processing feature of the processing procedure corresponding to the historical security incident, and determine the security control level based on the incident level of the historical security incident, and determine the key control subject based on the incident information. The management cloud platform may take the security control level and the key control subject corresponding to the historical security incident as the reference control level and the reference control subject corresponding to the historical processing feature, and take the historical processing feature and the reference control level and the reference control subject corresponding to the historical processing feature into the control parameter database.

In some embodiments, the security control level may be positively correlated with the incident level of the historical security incident. The higher the incident level, the higher the security control level.

In some embodiments, the key control subject may be determined based on various ways. For example, the key control subject may be preset by the technician based on the incident information. As another example, the management cloud platform may determine the key control subject through an incident model based on the incident information.

The incident model refers to a model used to determine the key control subject. In some embodiments, the incident model may be a machine learning model.

The management cloud platform may train the incident model through a gradient descent method, or the like, based on sample incident information and an actual key control subject corresponding to the sample incident information.

In some embodiments, the sample incident information may be obtained based on historical data. The actual key control subject corresponding to the sample incident information may be preset by the technician based on actual situations.

In some embodiments, the incident model may be trained by inputting a plurality of sample incident information into an initial incident model, constructing a loss function through labels and a prediction result of the initial incident model, iteratively updating the initial incident model based on the loss function, and completing the training of the incident model when the loss function of the initial incident model satisfies a preset condition. The preset condition may be that the loss function converges, a count of iterations reaches a set value, etc.

S23, for each processing procedure on the production line, a historical processing feature that satisfies a preset retrieval condition may be retrieved in the control parameter database based on the processing feature of the processing procedure, and a reference control level and a reference control subject corresponding to the historical processing feature may be taken as the security control level and the key control subject of the processing procedure. The preset retrieval condition may include that the processing feature has the highest similarity to the historical processing feature. The similarity between the processing feature and the historical processing feature may be determined by constructing a vector and calculating a vector distance, or the like.

In some embodiments, the management cloud platform may take each processing procedure on the production line, and the security control level and the key control subject corresponding to the processing procedure as the security control parameter.

In some embodiments, the management cloud platform may determine, based on security monitoring information, a mapping relationship between an effective control parameter and the production information; and determine, based on the mapping relationship and the production information, the security control parameter.

More descriptions regarding the security monitoring information may be found in the related descriptions of FIG. 2.

The effective control parameter is a security control parameter that produces an effective control effect.

In some embodiments, the management cloud platform may count the security monitoring information and a count of security warning signals issued for a security control region, and calculate a ratio of the count of the security warning signals to a count of monitoring subjects in the security monitoring information to obtain a proportion of warning quantity. In response to determining that the proportion of warning quantity is greater than a preset proportion threshold, the security control parameter corresponding to the security control region may be taken as the effective control parameter. The preset proportion threshold may be preset based on historical experience.

The preset proportion threshold may be adjusted based on the actual situations. For example, if a security incident occurs in the security control region due to the failure to issue the security warning signal, the preset proportion threshold may be lowered.

In some embodiments, the mapping relationship between the effective control parameter and the production information may include a definition domain, a value domain, and a correspondence between the definition domain and the value domain.

In some embodiments, the management cloud platform may determine the mapping relationship in various ways. For example, the management cloud platform may construct a mapping relationship between the production information and an updated control parameter by putting the production information into the definition domain as an independent variable and the updated control parameter into the value domain as a dependent variable. The mapping relationship may be a discrete relationship, and each independent variable may correspond to each dependent variable. The updated control parameters may be an updated effective control parameter.

In some embodiments, for each effective control parameter, the management cloud platform may update the effective control parameter in various ways. For example, the management cloud platform may obtain the updated control parameter by updating the security control level in the effective control parameter based on the proportion of warning quantity corresponding to the effective control parameter. For example, the higher the proportion of warning quantity, the higher the updated security control level.

In some embodiments, the management cloud platform may determine the mapping relationship based on a mapping model.

The mapping model is a model that is used to update the effective control parameter. In some embodiments, the mapping model may be a machine learning model. The management cloud platform may train the mapping model through the gradient descent method, or the like, based on sample production information and an actual updated control parameter.

In some embodiments, the sample production information may be obtained based on the historical data. The management cloud platform may determine, based on the sample production information and the historical data, a historical production process corresponding to the sample production information, and determine the effective control parameter in the historical production process, and obtain the actual updated control parameter corresponding to the sample production information through the process of updating the effective control parameter described above.

The training process of the mapping model may be similar to that of the incident model, and may be found the training process of the incident model.

In some embodiments, the management cloud platform may obtain management perception information from an IIoT perceptual control platform via an IIoT management platform through an IIoT sensor network platform; and update the mapping relationship based on the management perception information.

More descriptions regarding the management perception information may be found in FIG. 2 and related descriptions thereof.

In some embodiments, the operation device may be provided with a camera. The camera may be configured to recognize an operation device and an operator which cause interference to the operation device. The operation device may automatically determine whether the movement of the operation device is interfered with, and send an alarm upon receipt of the interference, and upload the operation device and the operator which cause the interference to the operation device to the IIoT perceptual control platform as the management perception information. The movement of the operation device being interfered with may include an obstacle on a travel path.

In some embodiments, the operation device may adjust an intensity of the issued alarm based on an alarm level. The higher the alarm level, the higher the intensity of the alarm issued by the operation device. The intensity of the alarm may be characterized by, for example, loudness. The alarm level may be preset by the technician based on the actual situations.

In some embodiments, the management cloud platform may update the mapping relationship based on the management perception information. For example, the management cloud platform may count the quantity of the management perception information related to the security control region, and add the management perception information to the count of the security warning signals in the proportion of warning quantity to obtain a new proportion of warning quantity. If the new proportion of warning quantity exceeds the preset proportion threshold, the management cloud platform may update the security control parameter corresponding to the security control region by the process of updating the effective control parameter described above. The management cloud platform may use an updated security control parameter as a new dependent variable of the production information in the mapping relationship.

As another example, the management cloud platform may retrain the mapping model based on the production information and the updated security control parameter.

In some embodiments of the present disclosure, by updating the mapping relationship, the accuracy of the mapping relationship can be improved, thereby improving the accuracy of the subsequent determination of the security control parameter.

In some embodiments, the management cloud platform may match the current production information with the independent variable in the definition domain, and use a dependent variable mapped by the matched independent variable as the security control parameter.

In some embodiments, the management cloud platform may input the current production information into the mapping model, and determine the updated control parameter output by the mapping model as the security control parameter.

In some embodiments of the present disclosure, the security control parameter can be rapidly determined through the mapping relationship and the production information, thereby improving the efficiency of determining the security control parameter.

In 330, sending the security control parameter to the IIoT management platform, the IIoT management platform determining a security control region of the at least one production line based on the security control parameter.

In some embodiments, the IIoT management platform may determine a processing procedure of which a security control level in the security control parameter is greater than a preset level threshold as a target control procedure. The preset level threshold may be preset based on historical experience.

In some embodiments, the preset level threshold may be set based on the processor performance (e.g., the maximum operation frequency of the processor, etc.) of the IIoT management platform. The higher the processor performance, the lower the preset level threshold.

In some embodiments, for the target control procedure, the security control region of the target control procedure may be determined by the process of determining the security control region based on an associated time period and an associated region described above. More descriptions regarding the associated time period and the associated region may be found in the related descriptions of FIG. 2.

In 340, obtaining the security control region through the IIoT management platform.

More descriptions may be found in FIG. 2 and related descriptions thereof.

In some embodiments of the present disclosure, the production information of the plurality of production lines is statistically analyzed by making full use of the big data learning and processing capability and the data sharing feature of the management cloud platform to obtain the security control parameter, and the security control region is determined based on the security control parameter, so as to improve the efficiency and precision of determining the security control region.

It should be noted that the foregoing description of the process 300 is intended to be exemplary and illustrative only and does not limit the scope of application of the present disclosure. For a person skilled in the art, various corrections and changes can be made to the process 300 under the guidance of the present disclosure. However, these corrections and changes remain within the scope of the present disclosure.

FIG. 4 schematic structural diagram illustrating an exemplary risk recognition model according to some embodiments of the present disclosure.

In some embodiments, as shown in FIG. 4, a management cloud platform may determine security risk data 450 based on security monitoring information 410 and a security control parameter 420 through a risk recognition model 430. More descriptions regarding the security monitoring information, the security risk data, and the security control parameter may be found in FIG. 2 and FIG. 3 and related descriptions thereof.

In some embodiments, the risk recognition model is a model for determining the security risk data. In some embodiments, the risk recognition model may be a machine learning model.

In some embodiments, the risk recognition model may include a feature layer 431 and a recognition layer 432. In some embodiments, the feature layer 431 may be a convolutional neural network (CNN). The recognition layer 452 may be a deep learning neural network (DNN).

In some embodiments, an input the feature layer may include the security monitoring information 410, and an output of the feature layer may include a monitoring feature 440. In some embodiments, an input of the recognition layer may include the security control parameter 420 and the monitoring feature 440, and an output of the recognition layer may include the security risk data 450.

The monitoring feature is used to characterize the security monitoring information.

In some embodiments, the management cloud platform may jointly train the feature layer and the recognition layer based on a training set. The training set may include a large number of training samples with labels. The training samples may include sample security monitoring information and sample security monitoring parameters. The labels may include actual security risk data. In some embodiments, the training samples and the labels may be determined based on historical data.

In some embodiments, the management cloud platform may use historical security monitoring information in a historical monitoring database and a historical security control parameter corresponding to the historical security monitoring information as the training samples, and historical security risk data corresponding to the historical security control parameter as the labels. The historical security control parameter may be determined by the method in FIG. 3.

In some embodiments, the risk recognition model may be trained by inputting a plurality of sample security monitoring information into an initial feature layer to obtain sample monitoring features outputted from the initial feature layer, inputting sample monitoring features and the sample security monitoring parameters into an initial recognition layer, constructing a loss function from the labels and a prediction result of the initial recognition layer, iteratively updating the initial feature layer and the initial recognition layer based on the loss function, and completing the training of the risk recognition model when the loss function of the initial recognition layer satisfies a preset condition. More descriptions regarding the preset condition may be found in the operation 320 and related descriptions thereof.

In some embodiments, in response to an update of the mapping relationship, the management cloud platform may construct an updated training set based on management perception information.

More descriptions regarding the update of the mapping relationship may be found in the related descriptions of FIG. 3.

The updated training set is a training set after being updated.

In some embodiments, the management cloud platform may determine an incident level based on an alarm level of an operation device that issues the alarm in the management perception information, take the operation device that issues the alarm as a target monitoring subject, and construct new security risk data as a new label based on the target monitoring subject and the incident level of the target monitoring subject. The management cloud platform may determine, based on the management perception information, an operation device and/or an operator that causes interference to the operation device, and take security monitoring information corresponding to the operation device and/or the operator as new sample security monitoring information.

The management cloud platform may add the new label and the new sample security monitoring information to the training set to obtain the updated training set.

More description regarding the alarm level, the incident level, and the target monitoring subject may be found in the related descriptions of FIG. 2 and FIG. 3.

In some embodiments of the present disclosure, by updating the training set, the accuracy and generalization of the risk recognition model can be improved, thereby improving the accuracy of predicted security risk data.

In some embodiments of the present disclosure, the security risk data is predicted using the risk recognition model, which can effectively predict the security risk data using the self-learning ability of the machine learning model.

Some embodiments of the present disclosure further provide a non-transitory computer-readable storage medium storing computer instructions that, when read by a computer, may direct the computer to implement the method for IIoT security management based on the management cloud platform described in any one of the above embodiments.

In addition, certain features, structures, or characteristics of one or more embodiments of the present disclosure may be appropriately combined.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

What is claimed is:

1. A method for industrial Internet of Things (IIoT) security management based on a management cloud platform, wherein the method is implemented by a management cloud platform of an IIoT security management system based on a management cloud platform, and the method comprises:

obtaining a security control region of at least one production line through an IIoT management platform corresponding to the at least one production line, including:
    obtaining production information of the at least one production line and the security control region for a plurality of time periods through the IIoT management platform; the security control region for the plurality of time periods being determined through the IIoT management platform corresponding to the at least one production line; and
    determining a security control node based on the production information through the IIoT management platform, and determining the security control region for the plurality of time periods based on the security control node; wherein the production information includes device operation information, and the determining a security control node based on the production information through the IIoT management platform includes:
        constructing a device operation vector based on the device operation information,
        matching a historical device operation vector that satisfies a preset matching condition in a vector database,
        counting management perception information corresponding to the historical device operation vector:
        determining an interference frequency based on the management perception information; and
        determining an operation device of which the interference frequency is greater than a frequency threshold as the security control node;

determining a security monitoring parameter of the security control region;

generating a security monitoring instruction based on the security monitoring parameter and sending the security monitoring instruction to a security monitoring device of an IIoT perceptual control platform through the IIoT management platform;

obtaining security monitoring information collected by the security monitoring device based on the security monitoring parameter;

generating, based on the security monitoring information, a security management parameter of the security control region, the security management parameter including at least one of a security warning parameter and a production scheduling parameter, and sending the security management parameter to the IIoT management platform, including:
    determining security risk data of the at least one production line based on the security monitoring information through a risk recognition model, wherein the risk recognition model is a machine learning model, the risk recognition model includes a feature layer and a recognition layer; an input of the feature layer includes the security monitoring information, and an output of the feature layer includes a monitoring feature; an input of the recognition layer includes a security control parameter and the monitoring feature, an output of the recognition layer includes the security risk data, a training of the risk recognition model includes an updated training, the updated training includes: in response to an update of a mapping relationship between an effective control parameter and the production information, constructing an updated training set based on the management perception information, and updating and training the risk recognition model based on the updated training set;
    determining controllable data and uncontrollable data based on the security risk data;
    determining the security warning parameter based on the controllable data; and
    determining the production scheduling parameter based on the uncontrollable data and production information of the at least one production line;

in response to determining that confirmation information sent by the IIoT management platform is received, generating a security management instruction based on the confirmation information;

sending the security management instruction to the IIoT perceptual control platform through the IIoT management platform, the IIoT perceptual control platform including a warning platform and an operation platform, the warning platform being configured to control a warning device to issue a security warning signal based on the security warning parameter, and/or the operation platform being configured to update an operation parameter of the at least one production line based on the production scheduling parameter; and obtaining an execution result of the warning platform based on the security management instruction, and adjusting the security monitoring parameter based on the execution result.

2. The method of claim 1, wherein the obtaining a security control region of at least one production line through an IIoT management platform corresponding to the at least one production line further includes:

obtaining production information of the at least one production line through the IIoT management platform;

determining a security control parameter of the at least one production line based on the production information, including:
    determining the mapping relationship between the effective control parameter and the production information based on the security monitoring information; and
    determining the security control parameter based on the mapping relationship and the production information;

sending the security control parameter to the IIoT management platform, the IIoT management platform determining the security control region of the at least one production line based on the security control parameter; and obtaining the security control region through the IIoT management platform.

3. A non-transitory computer-readable storage medium storing computer instructions that, when read by a computer, direct the computer to implement the method of claim 1.

4. The method of claim 1, wherein the frequency threshold is negatively correlated with a count of overlapping production lines, and the overlapping production lines are other production lines of which production time periods are same as or partially overlap with production time periods of the current production line.

5. The method of claim 2, wherein the determining the mapping relationship between the effective control parameter and the production information further includes:
- obtaining the management perception information from the IIoT perceptual control platform through the IIoT management platform corresponding to the at least one production line through an IIoT sensor network platform; and
- updating the mapping relationship based on the management perception information.

6. The method of claim 2, wherein the determining the mapping relationship between the effective control parameter and the production information further includes:
- for each effective control parameter,
  - obtaining the updated control parameter by updating a security control level in the effective control parameter based on a proportion of warning quantity corresponding to the effective control parameter; and
  - constructing a mapping relationship between the production information and the updated control parameter by putting the production information into a definition domain as an independent variable and the updated control parameter into the value domain as a dependent variable.

7. The method of claim 1, wherein the warning platform being configured to control a warning device to issue a security warning signal based on the security warning parameter includes:
- issuing the security warning signal to the operator in the security control region through an audio/video device and/or a user device by the warning platform; and
- issuing the security warning signal to the operation device through a warning accessory of the operation device by the warning platform.

8. A system for industrial Internet of Things (IIoT) security management based on a management cloud platform, wherein the system comprises the management cloud platform and at least one subsystem, the at least one subsystem includes a subsystem corresponding to at least one production line, each of the at least one subsystem includes an IIoT user platform, an IIoT service platform, an IIoT management platform, an IIoT sensor network platform, and an IIoT perceptual control platform, and the management cloud platform is configured to:
- obtain a security control region of the at least one production line through the IIoT management platform corresponding to the at least one production line, including:
  - obtaining production information of the at least one production line and the security control region for a plurality of time periods through the IIoT management platform; the security control region for the plurality of time periods being determined through the IIoT management platform corresponding to the at least one production line; and
  - determining a security control node based on the production information through the IIoT management platform, and determining the security control region for the plurality of time periods based on the security control node; wherein the production information includes device operation information, and the determining a security control node based on the production information through the IIoT management platform includes:
    - constructing a device operation vector based on the device operation information,
    - matching a historical device operation vector that satisfies a preset matching condition in a vector database,
    - counting management perception information corresponding to the historical device operation vector;
    - determining an interference frequency based on the management perception information; and
    - determining an operation device of which the interference frequency is greater than a frequency threshold as the security control node;
- determine a security monitoring parameter of the security control region;
- generate a security monitoring instruction based on the security monitoring parameter and send the security monitoring instruction to a security monitoring device of the IIoT perceptual control platform through the IIoT management platform;
- obtain security monitoring information collected by the security monitoring device based on the security monitoring parameter;
- generate, based on the security monitoring information, a security management parameter of the security control region, the security management parameter including at least one of a security warning parameter and a production scheduling parameter, and send the security management parameter to the IIoT management platform, including:
  - determining security risk data of the at least one production line based on the security monitoring information through a risk recognition model, wherein the risk recognition model is a machine learning model, the risk recognition model includes a feature layer and a recognition layer; an input of the feature layer includes the security monitoring information, and an output of the feature layer includes a monitoring feature; an input of the recognition layer includes a security control parameter and the monitoring feature, an output of the recognition layer includes the security risk data, a training of the risk recognition model includes an updated training, the updated training includes: in response to an update of a mapping relationship between an effective control parameter and the production information, constructing an updated training set based on the management perception information, and updating and training the risk recognition model based on the updated training set;
  - determining controllable data and uncontrollable data based on the security risk data;
  - determining the security warning parameter based on the controllable data; and
  - determining the production scheduling parameter based on the uncontrollable data and production information of the at least one production line;
- in response to determining that confirmation information sent by the IIoT management platform is received, generate a security management instruction based on the confirmation information;
- send the security management instruction to the IIoT perceptual control platform through the IIoT management platform, the IIoT perceptual control platform including a warning platform and an operation platform, the warning platform being configured to control a warning device to issue a security warning signal based on the security warning parameter, and/or the operation platform being configured to update an operation parameter of the at least one production line based on the production scheduling parameter; and obtain an execution result of the warning platform based on the security management instruction, and adjusting the security monitoring parameter based on the execution result.

9. The system of claim 8, wherein the management cloud platform is further configured to:

obtain production information of the at least one production line through the IIoT management platform;

determine a security control parameter of the at least one production line based on the production information, including:

determining the mapping relationship between the effective control parameter and the production information based on the security monitoring information; and determining the security control parameter based on the mapping relationship and the production information;

send the security control parameter to the IIoT management platform, the IIoT management platform determining the security control region of the at least one production line based on the security control parameter; and obtain the security control region through the IIoT management platform.

* * * * *